United States Patent
Nelson et al.

(10) Patent No.: US 10,454,656 B1
(45) Date of Patent: Oct. 22, 2019

(54) AFDX SWITCH SUPPORTING MULTIPLE TYPES OF DATA TRAFFIC

(71) Applicant: Rockwell Collins, Inc., Cedar Rapids, IA (US)

(72) Inventors: Brent J. Nelson, Marion, IA (US); Matthew P. Corbett, Mount Vernon, IA (US); Nicholas H. Bloom, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 241 days.

(21) Appl. No.: 15/656,957

(22) Filed: Jul. 21, 2017

(51) Int. Cl.
*H04L 29/08* (2006.01)
*H04L 5/14* (2006.01)
*H04L 12/947* (2013.01)
*H04L 12/18* (2006.01)
*H04L 29/12* (2006.01)
*H04L 12/741* (2013.01)

(52) U.S. Cl.
CPC ............... *H04L 5/14* (2013.01); *H04L 12/18* (2013.01); *H04L 45/74* (2013.01); *H04L 49/25* (2013.01); *H04L 61/2069* (2013.01); *H04L 61/6022* (2013.01); *H04L 61/6059* (2013.01); *H04L 61/6086* (2013.01)

(58) Field of Classification Search
None
See application file for complete search history.

(56) References Cited

U.S. PATENT DOCUMENTS

| | | | |
|---|---|---|---|
| 6,925,088 B1* | 8/2005 | Moreaux | H04L 12/44 370/400 |
| 2013/0051396 A1* | 2/2013 | Hall | H04L 43/106 370/397 |
| 2014/0310354 A1* | 10/2014 | Fountain | H04L 12/4641 709/204 |
| 2015/0281130 A1* | 10/2015 | Lembcke | H04L 49/351 370/276 |
| 2017/0064049 A1* | 3/2017 | Schneider | H04L 12/437 |

* cited by examiner

*Primary Examiner* — Alex Skripnikov
*Assistant Examiner* — Pamit Kaur
(74) *Attorney, Agent, or Firm* — Donna P. Suchy; Daniel M. Barbieri (57) ABSTRACT

Improved AFDX switches can handle various types of data traffics beyond a predefined AFDX related communication protocol. An AFDX switch can determine a mismatch between a MAC address of a received data frame and a MAC address constant specific to the predefined AFDX related protocol. In response to the mismatch, the AFDX switch can determine a data traffic type associated with the data frame based on a first portion of a header of the data frame. The AFDX switch can compare, responsive to determining a data traffic type associated with the data frame, a second portion of the header of the data frame to identifiers of a plurality of communication flows. Responsive to identifying a communication flow with a matching identifier, the AFDX switch can route the data frame based on communication flow parameters of the identified communication flow.

20 Claims, 4 Drawing Sheets

| Traffic Type | Protocol Layer / Parameter | Identification | Switch Based On |
|---|---|---|---|
| A664, part 7 | MAC - Destination Address | Destination MAC Addr = 03:00:00:00:VL:ID | VL:ID of Destination MAC Addr |
| 802.3 Multicast IPv4 | MAC - Destination Address MAC - EtherType | Destination MAC Addr = 01:00:5E:XX:XX:XX. EtherType of 0x800. | Use lower 16 of Destination MAC Address like VL:ID. If IP constrained to 224.224.VL.ID, only 16 bits needed. Alternatively, could hash the lower 23 bits. |
| 802.3 Multicast IPv6 | MAC - Destination MAC - EtherType | Destination MAC Addr = 33:33:XX:XX:XX:XX. EtherType of 0x86DD | Use lower 16 of Destination MAC Address like VL:ID. Alternatively, could hash the lower 32 bits. |
| 802.3 Unicast IPv4 | MAC - Destination Address MAC - EtherType IP - Destination Address IP - Source Address IP - Type Of Service | Destination MAC Addr with LSB of first byte not set (e.g., 02:XX:XX:XX:XX) EtherType of 0x800. | Hash of Dest IP, Source IP, and Type of Service. Alternatively, if locally administered MAC, could use Source and Destination MAC. |
| 802.3 Unicast IPv6 | MAC - Destination Address MAC - EtherType IP - Destination Address IP - Source Address IP - Traffic Class | Destination MAC Addr with LSB of first byte not set (e.g. 02:XX:XX:XX:XX) EtherType of 0x86DD | Hash of Dest IP, Source IP, and Traffic Class. Alternatively, if locally administered MAC, could use Source and Destination MAC. |
| ARP | MAC - EtherType MAC - Destination Address | EtherType of 0x806. Requests have broadcast MAC. Response is unicast. | Identification as ARP is sufficient. |

FIG. 4

AFDX SWITCH SUPPORTING MULTIPLE TYPES OF DATA TRAFFIC

BACKGROUND

Many new generations of commercial aircrafts support avionics full-duplex switched Ethernet (AFDX). AFDX networks usually include two types of devices; AFDX switches and AFDX end systems. AFDX architecture allows for reliable full-duplex deterministic networks that can provide guaranteed deterministic timing and redundancy. AFDX end systems are associated with devices, such as sensors, radar systems, and/or electronic systems, whose applications access the AFDX network components to transmit data to or receive data from the network. AFDX switches are connected to AFDX end systems and are configured to perform data traffic routing, policing and filtering. In particular, AFDX switches are configured to discard data traffic not complying with ARINC 664 standard. As such, AFDX networks do not allow interfacing with external devices using non-ARINC 664 data traffic.

SUMMARY

In one aspect, the inventive concepts disclosed herein are directed to an avionics full-duplex switched Ethernet (AFDX) switch including at least one receive port for receiving data, a memory for storing communication flow parameters for a plurality of communication flows handled by the AFDX switch, and a processing circuitry. The processing circuitry can receive a data frame via a receive port of the at least one receive port, and determine a mismatch between a destination media access control (MAC) address of the data frame and a MAC address constant specific to a predefined AFDX related protocol. The processing circuitry can determine, responsive to the mismatch between the MAC address of the data frame and the MAC address constant specific to the predefined AFDX related protocol, a data traffic type associated with the data frame based on a first portion of a header of the data frame. The data traffic type can be different than data traffic associated with the predefined AFDX related protocol. The processing circuitry can compare, responsive to determining a data traffic type associated with the data frame, a second portion of the header of the data frame to identifiers of the plurality of communication flows. Responsive to identifying a communication flow among the plurality of communication flows with a respective identifier matching the second portion of the header of the data frame, the processing circuitry can route the data frame based on communication flow parameters stored in the memory of the identified communication flow.

Determining a data traffic type associated with the data frame can include the processing circuitry determining the data traffic type to be Internet Protocol version four (IPv4) multicast, responsive to determining a match between a first three bytes of the destination MAC address of the data frame and a corresponding first constant, and a match between a MAC-EtherType value of the data frame and a corresponding second constant value. The first and second constant values can be specific to IPv4 multicast. The processing circuitry can identify the communication flow among the plurality of communication flows based on a first subset of bits of the destination MAC address or a hash of a second subset of bits of the destination MAC address.

Determining a data traffic type associated with the data frame can include determining the data traffic type to be Internet Protocol version six (IPv6) multicast responsive to determining a match between the first two bytes of the destination MAC address of the data frame and a corresponding first constant, and a match between a MAC-EtherType value of the data frame and a corresponding second constant value. The first and second constant values can be specific to IPv6 multicast. The processing circuitry can identify the communication flow among the plurality of communication flows based on a first subset of bits of the destination MAC address or a hash of a second subset of bits of the destination MAC address.

Determining a data traffic type associated with the data frame can include determining the data traffic type to be Internet Protocol version four (IPv4) unicast responsive to determining a match between the first byte of the destination MAC address of the data frame and a corresponding first constant, and a match between a MAC-EtherType value of the data frame and a corresponding second constant value, the first and second constant values specific to IPv4 unicast. The processing circuitry can identify the communication flow among the plurality of communication flows based on at least one of a hash of a destination IP address, a source IP address, and a type of service value associated with the data frame, or a hash of the destination MAC address and a source MAC address.

Determining a data traffic type associated with the data frame can include determining the data traffic type to be Internet Protocol version six (IPv6) unicast responsive to determining a match between the first two bytes of the destination MAC address of the data frame and a first constant, and a match between a MAC-EtherType value of the data frame and a second constant value. The first and second constant values can be specific to IPv6 unicast. The processing circuitry can identify the communication flow among the plurality of communication flows based on at least one of a hash of a destination IP address, a source IP address, and a traffic class value associated with the data frame, or a hash of the destination MAC address and a source MAC address.

Determining a data traffic type associated with the data frame can include determining the data traffic type to be address resolution protocol (ARP) traffic responsive to determining a match between a MAC-EtherType value of the data frame and a corresponding constant value specific to ARP.

In a further aspect, the inventive concepts disclosed herein are directed to a method of routing data frames by an avionics full-duplex switched Ethernet (AFDX) switch. The method can include the AFDX switch maintaining communication flow parameters for a plurality of communication flows handled by the AFDX switch, and receiving a data frame via a receive port of the AFDX switch. The method can include the AFDX switch determining a mismatch between a destination media access control (MAC) address of the data frame and a MAC address constant specific to a predefined AFDX related protocol. The method can include the AFDX switch determining, responsive to the mismatch between the destination MAC address of the data frame and the destination MAC address constant specific to the predefined AFDX related protocol, a data traffic type associated with the data frame based on a first portion of a header of the data frame. The data traffic type can be different than data traffic associated with the predefined AFDX related protocol. The method can include the AFDX switch comparing, responsive to determining a data traffic type associated with the data frame, a second portion of the header of the data frame to identifiers of the plurality of communication flows.

The method can include the AFDX switch, responsive to identifying a communication flow among the plurality of communication flows with a respective identifier matching the second portion of the header of the data frame, routing the data frame based on communication flow parameters maintained by the AFDX switch of the identified communication flow.

Determining a data traffic type associated with the data frame can include the processing circuitry determining the data traffic type to be Internet Protocol version four (IPv4) multicast responsive to determining a match between a first three bytes of the destination MAC address of the data frame and a corresponding first constant, and a match between a MAC-EtherType value of the data frame and a corresponding second constant value. The first and second constant values can be specific to IPv4 multicast. The method can include identifying the communication flow among the plurality of communication flows based on a first subset of bits of the destination MAC address or a hash of a second subset of bits of the destination MAC address.

Determining a data traffic type associated with the data frame can include determining the data traffic type to be Internet Protocol version six (IPv6) multicast responsive to determining a match between the first two bytes of the destination MAC address of the data frame and a corresponding first constant, and a match between a MAC-EtherType value of the data frame and a corresponding second constant value. The first and second constant values can be specific to IPv6 multicast. The method can include identifying the communication flow among the plurality of communication flows based on a first subset of bits of the destination MAC address.

Determining a data traffic type associated with the data frame can include determining the data traffic type to be Internet Protocol version four (IPv4) unicast responsive to determining a match between the first byte of the destination MAC address of the data frame and a corresponding first constant, and a match between a MAC-EtherType value of the data frame and a corresponding second constant value, the first and second constant values specific to IPv4 unicast. The method can include identifying the communication flow among the plurality of communication flows based on at least one of a hash of a destination IP address, a source IP address, and a type of service value associated with the data frame, or a hash of the destination MAC address and a source MAC address.

Determining a data traffic type associated with the data frame can include determining the data traffic type to be Internet Protocol version six (IPv6) unicast responsive to determining a match between the first two bytes of the destination MAC address of the data frame and a first constant, and a match between a MAC-EtherType value of the data frame and a second constant value. The first and second constant values can be specific to IPv6 unicast. The method can include identifying the communication flow among the plurality of communication flows based on at least one of a hash of a destination IP address, a source IP address, and a traffic class value associated with the data frame, or a hash of the destination MAC address and a source MAC address.

Determining a data traffic type associated with the data frame can include determining the data traffic type to be address resolution protocol (ARP) traffic responsive to determining a match between a MAC-EtherType value of the data frame and a corresponding constant value specific to ARP.

In a further aspect, the inventive concepts disclosed herein are directed to An avionics full-duplex switched Ethernet (AFDX) system. The AFDX system can include at least one AFDX end system configured to determine traffic envelopes for data traffic not associated with a predefined AFDX related protocol using respective burst and data rate values, and an AFDX switch communicatively coupled to the at least one AFDX end system. The AFDX switch can be configured to maintain communication flow parameters for a plurality of communication flows handled by the AFDX switch. The AFDX switch can receive a data frame via a receive port of the AFDX switch, and determine a mismatch between a destination media access control (MAC) address of the data frame and a MAC address constant specific to the predefined AFDX related protocol. The AFDX switch can determine, responsive to the mismatch between the MAC address of the data frame and the MAC address constant specific to the predefined AFDX related protocol, a data traffic type associated with the data frame based on a first portion of a header of the data frame. The data traffic type can be different than data traffic associated with the predefined AFDX related protocol. The AFDX switch can compare, responsive to determining a data traffic type associated with the data frame, a second portion of the header of the data frame to identifiers of the plurality of communication flows. Responsive to identifying a communication flow among the plurality of communication flows with a respective identifier matching the second portion of the header of the data frame, the AFDX switch route the data frame based on communication flow parameters maintained by the AFDX switch of the identified communication flow.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4 shows a table illustrating example embodiments for identifying data traffic types and routing corresponding data frames, according to inventive concepts of this disclosure.

The details of various embodiments of the methods and systems are set forth in the accompanying drawings and the description below.

DETAILED DESCRIPTION

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

Avionics full-duplex switched Ethernet (AFDX) networks employ AFDX communication protocols derived from commercial Ethernet technology (or standards) with added provisions for guaranteed deterministic timing and redundancy. The deterministic provisions make Ethernet more suitable for safety critical systems such as avionics applications and systems. The Aeronautical Radio, Incorporated (ARINC) 664, part 7 standard defines an architecture of AFDX networks and the AFDX communication protocols supported by AFDX networks. The ARINC 664 (also referred to herein as A664) implementation guarantees a deterministic behavior, provides improved reliability, and works well on most airplanes. However, such improvements come at the expense limited types of data traffics supported by AFDX networks. In particular, data traffic not conforming with the ARINC 664 standard will end up being discarded by AFDX switches.

When a data frame arrives at an AFDX switch within an AFDX network, the AFDX switch can parse the respective header to retrieve a corresponding destination media access control (MAC) address. The AFDX switch can examine the retrieved MAC address to ensure that the upper four bytes match a corresponding constant specific to the ARINC 664 standard (e.g., the A664 multicast MAC address constant 03:00:00:00). If no match is found, the AFDX switch will discard the data frame. In the case of a match, the AFDX switch will perform a lookup based on a virtual link identifier (VLID) of the data frame to determine various account, policing, and routing information associated with the VLID. If the AFDX switch fails to determine such information when performing the VLID lookup, the AFDX switch will discard the data frame. In the case of successful VLID-based lookup, the AFDX switch can perform various checks (e.g. verifying that the data frame arrived at the right input port, traffic policing, etc.) using the data accessed via the VLID-based lookup. If the data frame passes all the checks, the AFDX switch can then transmit the data frame according to output ports (or priority) queues. A data frame non-conforming with the ARINC 664 standard will most likely be discarded based on the corresponding MAC address.

The limitations on supported data traffic types imposed by the ARINC 664 standard lead to technical and cost challenges on the use of AFDX networks on airplanes. An example technical challenge is the difficulty associated with hooking up (or connecting) an external device, such as a laptop, an Internet Protocol (IP) camera, or other communication devices, to an AFDX network. Such connections will most likely result in failed communication between the external device and the AFDX network as data frames generated by the external device will end up discarded by AFDX switches in the AFDX network. The ability of external devices to communicate with the AFDX network is important, for example, with regard to testing and maintenance systems.

One approach to address interfacing between external systems, such as testing and maintenance systems, and AFDX networks can include using specific equipment designed to interface with AFDX networks. Such an approach would increase the cost of the maintenance and testing of airplanes considering the increase in cost for specific equipment and the use of different equipment for distinct airplanes. Also, such an approach would not address the interfacing challenge for predefined applications such as maintenance and/or testing. New applications involving communications between AFDX networks and external equipment (e.g., equipment not part of the airplane) may call for additional new specific equipment.

In the current disclosure, improved AFDX switches that support various types of data traffic are described. Specifically, example embodiments of the current disclosure relate to modifying (or augmenting) AFDX switch functions to allow handling of data frames associated with one or more non-A664 traffic. The modifications include adding additional lookups to identify different types of non-A664 data traffic that is desired to be routed. Once a non-A664 data traffic is identified for a given data frame, the AFDX switch can route the data frame with the same integrity as A664 data traffic. Improved AFDX switches described in the current disclosure, in a way, extend the concept of virtual links (VLs) to non-A664 data traffic to allow consistent handling of A664 and non-A664 data traffics.

Figure 1:
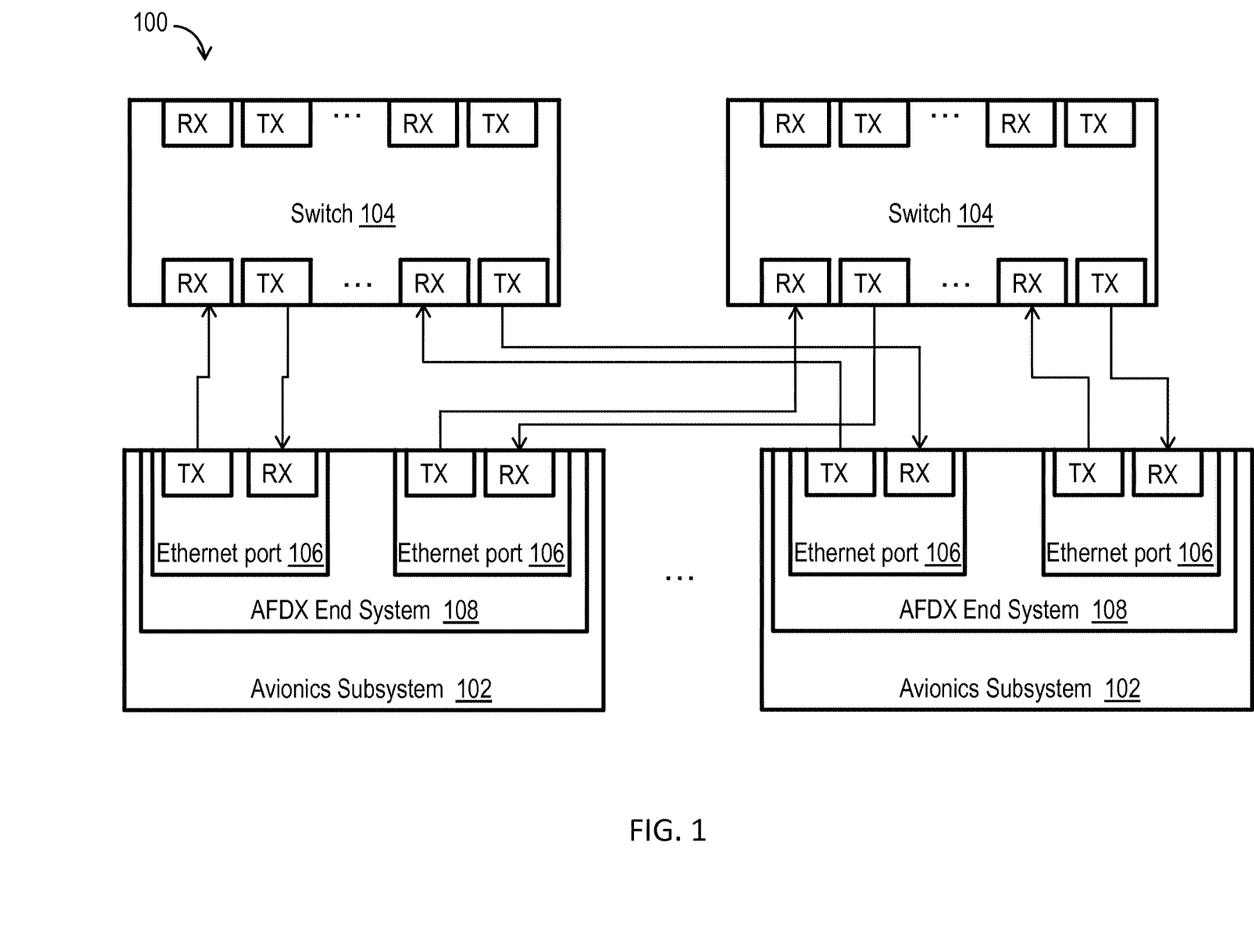
FIG. 1 shows a block diagram illustrating an example embodiment of an avionics full-duplex switched Ethernet (AFDX) network, according to inventive concepts of this disclosure.

Referring now to the drawings, FIG. 1 shows a block diagram illustrating an example embodiment of an AFDX system 100, according to inventive concepts of this disclosure. The AFDX system 100 can include a plurality of avionics subsystems 102 connected to a plurality of AFDX switches 104. Each AFDX switch 104 can be configured to route data between various avionics subsystems 102 according to a predefined AFDX related communication protocol (e.g., A664 protocol). For instance, each AFDX switch 104 can maintain a respective routing table to route data frames (or data packets) between various avionics subsystems 102.

Each avionics subsystem 102 can be an electronic device (or electronic system) fitted to or installed in an aircraft to perform a specific function, such as a weather radar, lighting detector, navigation system, traffic alert and collision avoidance system TCAS, ground-proximity warning system (GPWS), black box, a glass cockpit, aircraft flight-control system, the like, or a combination thereof. The electronics systems or devices can exchange data in performing respective functions. For example, the weather radar, the lightning detector, the navigation system, the TCAS or the GPWS may be configured to periodically report measured data or detected events to glass cockpits or the aircraft flight-control system. Considering the typically large number of avionics subsystems 102 in an aircraft, relying on physical links between each pair of avionics subsystems 102 communicating to one another can result in complex wiring. The AFDX system 100 allows for establishing VLs between avionics subsystems 102 communicating to one another.

Each avionics subsystem 102 can include an Ethernet port 106 for transmitting data to, or receiving data from, other avionics subsystems 102. Each Ethernet port 106 can include a transmit port and a receive port, or can include a port acting both as a transmit and a receive port. Each avionics subsystem 102 can include two (or multiple) Ethernet ports 106 to allow for redundant transmission of data. For example, the avionics subsystem 102 can transmit a data frame over two separate transmit ports to be routed over two separate communication routes. For instance, separate Ethernet ports 106 of an avionics subsystem can be connected to separate switches 104, respectively. The redundancy in data transmission allows for resilience against lost data frames (or data packets).

The avionics subsystem 102 can also include an AFDX end system 108 for handling communications with other avionics subsystems 102. Each AFDX end system 108 of an avionics subsystem 102 can establish and handle VLs with other avionics subsystem 102. For each data frame associated with a respective VL, the AFDX end system 108 can insert the corresponding VLID in the data frame. Each AFDX end system 108 can be viewed as an AFDX communication interface configured to handle communications for the corresponding avionics subsystem 102. The AFDX end system 108 can include a processor (e.g., a central processing unit (CPU), a microprocessor, a digital signal processor (DSP), a multi-core processor, a network processor, or the like), a microcontroller, an application-specific integrated circuit (ASIC), a field-programmable gate array (FPGA), a memory, or a combination thereof. The memory can maintain data queues of data frames (or data packets) or store computer code instructions to be executed by the processor. The computer code instructions, when executed by the processor, can cause the processor to generate data frames (e.g., with respective headers conforming to supported communication protocols), schedule data frames for transmission, transmit the data frames according a scheduling scheme, or a combination thereof.

Figure 2:
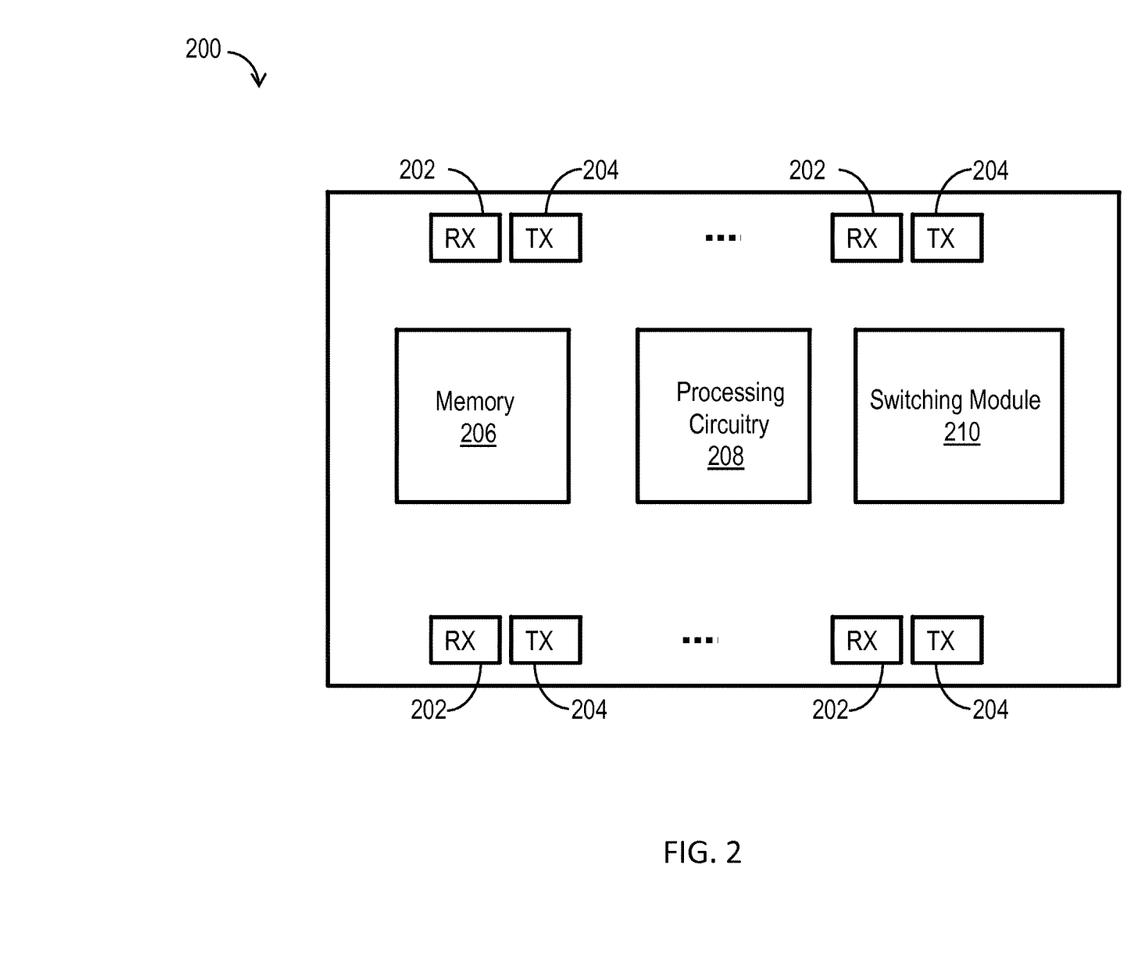
FIG. 2 shows a block diagram illustrating an example embodiment of an AFDX switch, according to inventive concepts of this disclosure.

Referring to FIG. 2, a block diagram illustrating an example embodiment of an AFDX switch 200, according to inventive concepts of this disclosure. In brief overview, the AFDX switch 200 can include a plurality of receive (RX) ports (or input ports) 202, a plurality of transmit (TX) ports (or output ports) 204, a memory 206, processing circuitry 208, and a switching module 210 (also referred to as switch fabric 210). The RX ports 202, as the name implies, can receive data frames from AFDX end systems 108 or other AFDX switches. The AFDX switch 200 can transmit data frames through the respective TX ports 204 to AFDX end systems 108 or other AFDX switches. In some implementations, the AFDX switch 200 can include communication ports configured to operate as both RX and TX ports.

The memory 206 can store information for use in processing data frames by the AFDX switch 200. For each communication flow, the memory 206 can store data indicative of a corresponding identifier, data traffic type, data frame header constant(s), RX port 102, TX port 104, data rate information, acceptable frame size(s), priority, other parameters, or a combination thereof. As used herein, a communication flow can include a VL, a logical communication link (or channel) between a pair of AFDX end systems 102, a communication session, or the like. For each VL, the memory 206 can store a VLID, a RX port 102 assigned to that VL, a TX port 104 assigned to that VL, a bandwidth allocation gap (BAG), frame size, maximum allowed jitter, account type, priority information or combination thereof. The memory 206 can store executable instructions for execution by the processing circuitry. The executable instructions can include instructions to perform functions associated with the AFDX switch 200 such as instructions for reading and/or writing data to the memory 206, instructions for parsing headers of received data frames, instructions for comparing data fields, instructions for managing operations of the AFDX switch, methods described in this disclosure, steps thereof, or a combination thereof.

The processing circuitry 208 can include a processor (e.g., a central processing unit (CPU), a microprocessor, a digital signal processor (DSP), a multi-core processor, a network processor, or the like), a microcontroller, an application-specific integrated circuit (ASIC), a field-programmable gate array (FPGA), or a combination thereof. The processing circuitry 208 can execute executable instructions stored in the memory 206, perform switching operations such as operations associated with the switching module 210, manage operations of the AFDX switch 200, manage switch health, or a combination thereof.

The switching module 210 can be configured to process received data frames, for example, by performing data frame filtering and traffic policing. In particular, the switching module 210 can be configured to perform methods described in the current disclosure. The switching module 210 can be implemented as software, hardware, firmware, or a combination thereof. For instance, the switching module 210 may be implemented as executable instructions that are stored in the memory 206 and executed by the processing circuitry 208. The switching module 210 may be implemented as hardware, for example, using transistors, comparators, diodes, integrated circuits, or a combination thereof. The switching module 210 may be implemented using one or more microcontrollers, an ASIC, a FPGA, or a combination thereof. The switching module 210 may be implemented using a combination of software and hardware such that a first portion of operations associated with the switching module are implemented as executable instructions while a second portion is implemented as one or more integrated circuits. The switching module 210 can be partially or completely included in the processing circuitry 208, or can be a separate component communicatively coupled to the processing circuitry 208.

Figure 3:
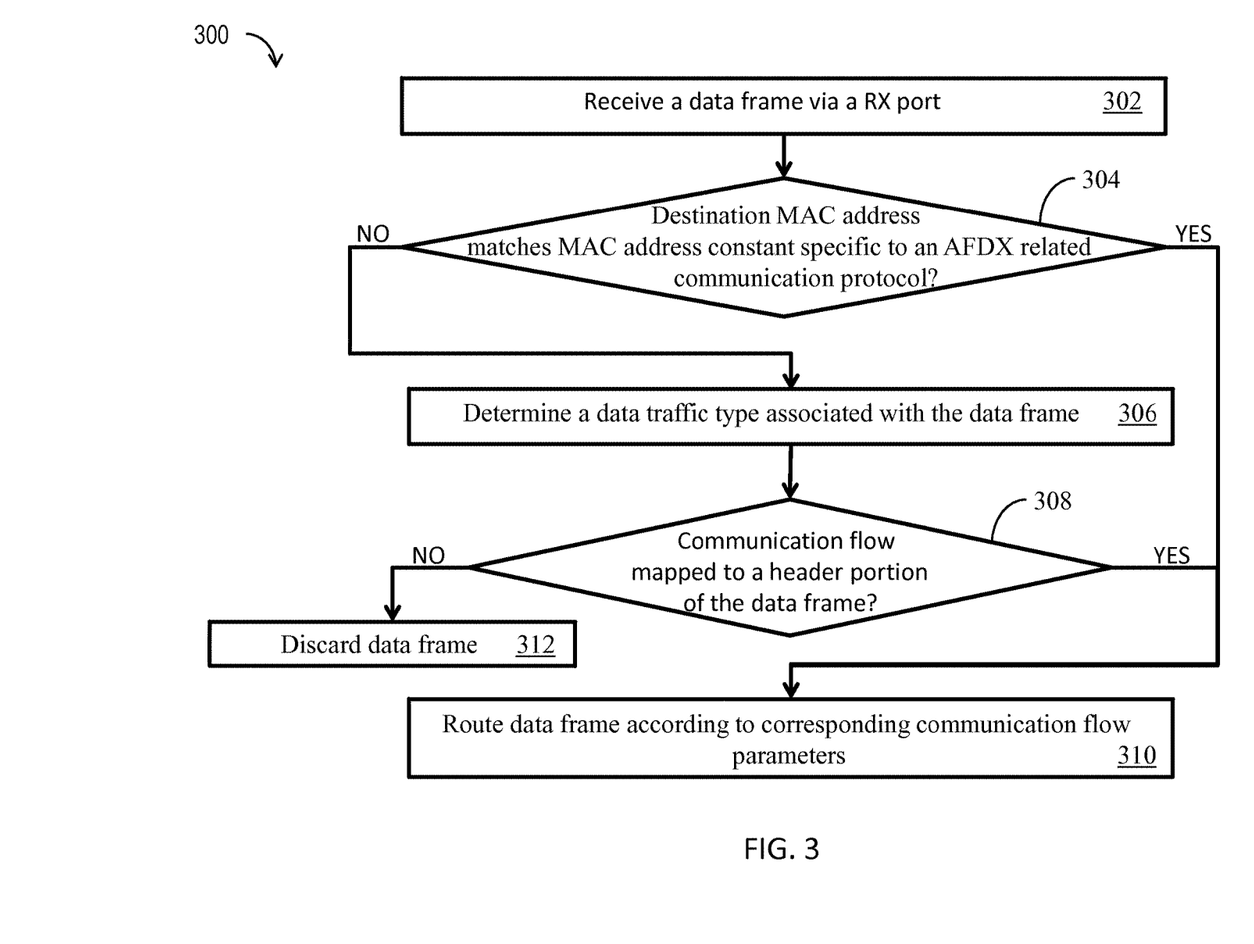
FIG. 3 shows a flowchart illustrating an example embodiment of a method of routing data frames by an AFDX switch, according to inventive concepts of this disclosure.

Referring to FIG. 3, a flowchart illustrating an example embodiment of a method 300 of routing data frames by an AFDX switch is shown, according to inventive concepts of this disclosure. In brief overview, the method 300 can include receiving a data frame via a RX port (step 302), and comparing a destination media access control (MAC) address of the received data frame to a MAC address constant specific to a predefined AFDX related protocol (decision block 304). The method 300 can include determining, responsive to a mismatch between the MAC address of the data frame and a MAC address constant specific to the predefined AFDX related protocol, a data traffic type associated with the data frame based on a first portion of the header of the data frame (step 306). The method 300 can include comparing identifiers of a plurality of communications flows to a second portion of the header of the data frame, responsive to determining a data traffic type associated with the data frame, (decision block 308). The method 300 can include routing the data frame based on communication flow parameters of a communication flow associated with the data frame (step 310). The method 300 can include discarding the data frame (step 312) in the case of no match is found at decision block 308 between the identifiers of the plurality of communications flows and the second portion of the header of the data frame.

The method 300 can include the processing circuitry 208, or the switching module 210, receiving a data frame via a RX port of the AFDX switch 200 (step 302). Upon receipt of the data frame, the processing circuitry 208, or the switching module 210, can parse the header of the data frame to retrieve a destination MAC address associated with the data frame. The processing circuitry 208 may also retrieve other data fields from the header for use in processing the data frame by the switching module 210.

The method 300 can include the processing circuitry 208, or the switching module 210, comparing the retrieved destination MAC address to a MAC address constant specific to a predefined AFDX related protocol (decision block 304). For instance, for a data frame associated with A664 data traffic, the corresponding destination MAC address includes a constant field corresponding to the first four bytes followed by the VLID of the VL associated with the data frame. The constant field (or first four bytes) can be equal to 03:00:00:00. As such, the processing circuitry 208, or the switching module 210, can compare the first of four bytes of the retrieved destination MAC address with the MAC address constant field specific to A664 protocol or A664 data traffic). If no match is found between the MAC address constant field specific to A664 protocol and the corresponding portion (e.g., first four bytes) of the retrieved destination MAC address, then the processing circuitry 208, or the switching module 210, can treat the data frame as a non-A664 data frame. In conventional AFDX switches, the data frame is discarded if no match is found between the MAC address constant field specific to A664 protocol and the corresponding portion (e.g., first four bytes) of the retrieved destination MAC address. However, in the AFDX switch 200, the processing circuitry 208 or the switching module 210 can proceed to step 306 to determine whether the data frame is associated with a supported non-A664 data traffic.

If a match is found between the MAC address constant field specific to A664 protocol and the corresponding portion (e.g., first four bytes) of the retrieved destination MAC address, then the processing circuitry 208, or the switching module 210, can treat the data frame as an A664 data frame. In response, the processing circuitry 208, or the switching module 210, can determine the VLID associated with the received data frame from the retrieved destination MAC address (VLID corresponds to lower 16 bits of destination MAC address), and route the data frame based VL parameters stored in memory 206 and associated with the determined VLID.

The method 300 can include the processing circuitry 208, or the switching module 210, determining a data traffic type associated with the data frame based on a first portion of the header of the data frame (step 306), responsive to the mismatch between the destination MAC address of the data frame and the MAC address constant specific to the predefined AFDX related protocol. Besides A664 data traffic, the AFDX switch 200 can support various other data traffic types, such as Internet Protocol version 4 (IPv4) multicast, Internet Protocol version 6 (IPv6) multicast, IPv4 unicast, IPv6 unicast, address resolution protocol (ARP) data traffic, other types of data traffic, or a combination thereof. The processing circuitry 208, or the switching module 210, can identify each type of data traffic based on one or more respective data fields in headers of data frames associated with that type of data traffic.

Referring to FIG. 4, a table listing example data fields for identifying data traffic types and routing corresponding data frames is shown, according to inventive concepts of this disclosure. For instance, IPv4 multicast data traffic is characterized by the first three bytes of corresponding destination MAC addresses being constant and equal to 01:00:5E, the corresponding MAC-EtherType fields being constant and equal to 0x800. As such, determining the data traffic type associated with the data frame can include the processing circuitry 208, or the switching module 210, comparing the first three bytes of the destination MAC address of the received data frame to the corresponding MAC address constant (e.g., 01:00:5E) specific to IPv4 multicast, and comparing the MAC-EtherType field of the received data frame to the corresponding MAC-EtherType constant (e.g., 0x800) specific to IPv4 multicast. If both comparisons result in successful matches, then the processing circuitry 208, or the switching module 210, can identify the data traffic type associated with the received data frame to be IPv4 multicast.

For IPv6 multicast data traffic, the first two bytes of corresponding destination MAC addresses can be constant and equal to 33:33, and the corresponding MAC-EtherType fields can be constant and equal to 0x86DD. As such, determining the data traffic type associated with the data frame can include the processing circuitry 208, or the switching module 210, comparing the first two bytes of the destination MAC address of the received data frame to the corresponding MAC address constant (e.g., 33:33) specific to IPv6 multicast, and comparing the MAC-EtherType field of the received data frame to the corresponding MAC-EtherType constant (e.g., 0x86DD) specific to IPv6 multicast. If both comparisons result in successful matches, then the processing circuitry 208, or the switching module 210, can identify the data traffic type associated with the received data frame to be IPv6 multicast.

For IPv4 unicast data traffic, the first byte of corresponding destination MAC addresses can be constant and equal to 02, and the corresponding MAC-EtherType fields can be constant and equal to 0x800. As such, determining the data traffic type associated with the data frame can include the processing circuitry 208, and/or the switching module 210, comparing the first byte of the destination MAC address of the received data frame to the corresponding MAC address constant (e.g., 02) specific to IPv4 unicast, and comparing the MAC-EtherType field of the received data frame to the corresponding MAC-EtherType constant (e.g., 0x800) specific to IPv4 unicast. If both comparisons result in successful matches, then the processing circuitry 208, or the switching module 210, can identify the data traffic type associated with the received data frame to be IPv4 unicast.

For IPv6 unicast data traffic, the first byte of corresponding destination MAC addresses can be constant and equal to 02, and the corresponding MAC-EtherType fields can be constant and equal to 0x86DD. As such, determining the data traffic type associated with the data frame can include the processing circuitry 208, or the switching module 210, comparing the first byte of the destination MAC address of the received data frame to the corresponding MAC address constant (e.g., 02) specific to IPv6 unicast, and comparing the MAC-EtherType field of the received data frame to the corresponding MAC-EtherType constant (e.g., 0x86DD) specific to IPv6 unicast. If both comparisons result in successful matches, then the processing circuitry 208, or the switching module 210, can identify the data traffic type associated with the received data frame to be IPv6 unicast.

For ARP data traffic, the corresponding MAC-EtherType fields can be constant and equal to 0x806. As such, determining the data traffic type associated with the data frame can include the processing circuitry 208, or the switching module 210, comparing the MAC-EtherType field of the received data frame to the corresponding MAC-EtherType constant (e.g., 0x806) specific to ARP data traffic. If the comparison results in successful match, then the processing circuitry 208, or the switching module 210, can identify the data traffic type associated with the received data frame to be ARP data traffic.

Determining the data traffic type associated with the received data frame can include parsing the header of the data frame and retrieving any other data fields (e.g., other than the destination MAC address and such as the MAC-EtherType field) that were not previously retrieved. If the processing circuitry 208, or the switching module 210, fails to identify a data traffic type (e.g., none of the checks associated with a supported list of data traffic types results in a match), the processing circuitry 208, or the switching module 210, can discard the data frame. While identification processes for five data traffic types are discussed above, the AFDX switch 200 can include any combination of these identification processes and/or any combination of other data traffic type identification processes associated with any other data traffic types.

Referring back to FIGS. 3 and 4, the method 300 can include comparing identifiers of a plurality of communications flows to a second portion of the header of the data frame, responsive to determining a data traffic type associated with the data frame (decision block 308). Each communication data flow handled by the AFDX switch 200 can be associated with a respective identifier. Such identifiers can be initially determined by the AFDX switch 200 and stored in the memory 206. The identifiers for various communication data flows can be stored in the memory 206 and accessed by the processing circuitry or the switching module 210. As illustrated in the table of FIG. 4, identifiers for communications flows associated with distinct data traffic types can defined differently.

For IPv4 multicast communication flows, respective identifiers can be defined to be equal to a specific subset of bits (e.g., the lower 16 bits) of the corresponding destination MAC addresses. An identifier of an IPv4 multicast communication flow can be defined as a hash of a specific subset of bits (e.g., the lower 23 or 24 bits) of the corresponding destination MAC address. As such, if the data traffic type determined at step 306 is IPv4 multicast, the processing circuitry 208, or the switching module 210, can compare the identifiers of the plurality of communications flows to a subset of bits (e.g., the lower 16 bits) of the destination MAC address of the received data frame, or to a hash of a subset of bits (e.g., a hash of the lower 23 bits or the 24 bits) of the destination MAC address of the received data frame to identify whether the received data frame belongs to an existing IPv4 multicast communication flow.

For IPv6 multicast communication flows, respective identifiers can be defined to be equal to a specific subset of bits (e.g., the lower 16 bits) of the corresponding destination MAC addresses. An identifier of an IPv6 multicast communication flow can be defined as a hash of a specific subset of bits (e.g., the lower 32 bits) of the corresponding destination MAC address. As such, if the data traffic type determined at step 306 is IPv6 multicast, the processing circuitry 208, or the switching module 210, can compare the identifiers of the plurality of communications flows stored in memory 206 (or a subset thereof) to a subset of bits (e.g., the lower 16 bits) of the destination MAC address of the received data frame, or to a hash of a subset of bits (e.g., a hash of the lower 32 bits) of the destination MAC address of the received data frame to identify whether the received data frame belongs to an existing IPv6 multicast communication flow.

For an IPv4 unicast communication flow, the respective identifier can be defined to be equal to a hash of the corresponding destination IP address, the corresponding source IP address, and the corresponding type of service. An identifier of an IPv4 unicast communication flow may alternatively be defined as a hash of the corresponding destination MAC address and the corresponding source MAC address if MAC addresses are locally administered. As such, if the data traffic type determined at step 306 is IPv4 unicast, the processing circuitry 208, or the switching module 210, can retrieve the destination IP address, the source IP address, and the Type Of Service field from the received data frame, compute a corresponding hash, and compare the computed hash to the identifiers of the plurality of communications flows stored in memory 206 (or a subset thereof) to identify whether the received data frame belongs to an existing IPv4 unicast communication flow. Alternatively, if MAC addresses are locally administered, the processing circuitry 208, and/or the switching module 210, can retrieve the destination MAC address and the source MAC address from the received data frame, compute a corresponding hash, and compare the computed hash to the identifiers of the plurality of communications flows stored in memory 206 (or a subset thereof) to identify whether the received data frame belongs to an existing IPv4 unicast communication flow.

For an IPv6 unicast communication flow, the respective identifier can be defined to be equal to a hash of the corresponding destination IP address, the corresponding source IP address, and the corresponding traffic class. An identifier of an IPv6 unicast communication flow may alternatively be defined as a hash of the corresponding destination MAC address and the corresponding source MAC address if MAC addresses are locally administered. As such, if the data traffic type determined at step 306 is IPv6 unicast, the processing circuitry 208, or the switching module 210, can retrieve the destination IP address, the source IP address, and the Traffic Class field from the received data frame, compute a corresponding hash, and compare the computed hash to the identifiers of the plurality of communications flows stored in memory 206 (or a subset thereof) to identify whether the received data frame belongs to an existing IPv4 unicast communication flow. Alternatively, if MAC addresses are locally administered, the processing circuitry 208, or the switching module 210, can retrieve the destination MAC address and the source MAC address from the received data frame, compute a corresponding hash, and compare the computed hash to the identifiers of the plurality of communications flows stored in memory 206 (or a subset thereof) to identify whether the received data frame belongs to an existing IPv4 unicast communication flow. For an ARP communication flow the identification as ARP can be sufficient. Also, identifiers for communication flows associated with other data traffic types can be defined and used by the switching module 210.

The method 300 can include routing the data frame based on communication flow parameters of a communication flow associated with the data frame (step 310). For instance, responsive to identifying a communication flow based on the second portion of the header of the received data frame, the processing circuitry 208, or the switching module 210, can route (or process) the data frame based on stored parameters associated with the identified communication flow (or the respective identifier. The memory 206 can store for each existing communication flow, a set of parameters mapped (or linked) to the identifier of that communication flow. The set of parameters can include the RX port 202 assigned to that communication flow, the TX port 204 assigned to that communication flow, the corresponding data rate, corresponding data frame size information (e.g., maximum data frame size), other parameters, or a combination thereof. The processing circuitry 208, or the switching module 210, can read (or retrieve) such parameters from the memory 206 using the communication flow identifier matching the second portion of the data frame header, and perform a set of checks on the data frame using the retrieved parameters. Such checks can include comparing the data frame size to the maximum size allowed, comparing measured (or estimated) data rate to retrieved data rate parameter, comparing the RX port at which the data framed was received to the RX port assigned to the identified communication flow, performing other checks, or a combination thereof. If the performed checks are successful, the processing circuitry 208, or the switching module 210, can provide the data frame to the TX port assigned to the identified communication flow for transmitting to an AFDX end system 102 or to another ADFX switch. If one or more of the checks fail, the processing circuitry 208, or the switching module 210, can discard the data frame.

The method 300 can include discarding the data frame (step 312) in the case of no match is found at decision block 308 between the identifiers of the plurality of communications flows and the second portion of the header of the data frame. In other words, if no communication flow is identified to be associated with the data frame, the processing circuitry 208, or the switching module 210, can discard the data frame.

According to example embodiments of the current disclosure, an AFDX system (or AFDX network) can include at least one AFDX end system configured to determine traffic envelopes for data traffic not associated with a predefined AFDX related protocol (e.g., non-A664 data traffic) using respective burst and data rate values. The AFDX system can also include one or more AFDX switches configured to perform the methods discussed above with regard to FIG. 3. While A664 traffic is shaped (e.g., respective performance parameters are set) using a respective BAG value assigned by the source AFDX end system 102, no BAG parameter is defined in other communication protocols. To shape non-A664 traffic, an AFDX end system 102 can determine (or estimate) a long term rate (e.g., in frames/msec) and a burst for a given type of data traffic. The long term rate can be computed as a total number of data frames received or transmitted during a given time period divided by that time period during. The AFDX system 102 can shape traffic of the given type using the determined burst and determined long term data rate. For example, if an application outputs 2 frames at 20 Hz (50 milliseconds), the burst can be determined to be equal to 2 and the long term data rate can be determined to be number of frames/Interval=2/50.

The construction and arrangement of the systems and methods are described herein as illustrative examples and are not to be construed as limiting. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method of operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. An avionics full-duplex switched Ethernet (AFDX) switch comprising: at least one receive port for receiving data;
   a memory for storing communication flow parameters for a plurality of communication flows handled by the AFDX switch; and
   a processing circuitry configured to:
   receive a data frame via a receive port of the at least one receive port; determine a mismatch between a destination media access control (MAC) address of the data frame and a destination MAC address constant specific to a predefined AFDX related protocol;
   determine, responsive to the mismatch between the destination MAC address of the data frame and the destination MAC address constant specific to the predefined AFDX related protocol, a data traffic type associated with the data frame based on a first portion of a header of the data frame, the data traffic type different than data traffic associated with the predefined AFDX related protocol;
   compare, responsive to determining the data traffic type associated with the data frame, a second portion of the header of the data frame to identifiers of the plurality of communication flows; and
   responsive to identifying a communication flow among the plurality of communication flows with a respective identifier matching the second portion of the header of the data frame, route the data frame based on the communication flow parameters stored in the memory of the identified communication flow.

2. The AFDX switch of claim 1, wherein determining the data traffic type associated with the data frame includes determining the data traffic type to be Internet Protocol version four (IPv4) multicast responsive to determining a match between the first three bytes of the destination MAC address of the data frame and a corresponding first constant value, and a match between a MAC-EtherType value of the data frame and a corresponding second constant value, the first and second constant values specific to IPv4 multicast.

3. The AFDX switch of claim 2, wherein the processing circuitry is configured to identify the communication flow among the plurality of communication flows based on a first subset of bits of the destination MAC address or a hash of a second subset of bits of the destination MAC address.

4. The AFDX switch of claim 1, wherein determining the data traffic type associated with the data frame includes determining the data traffic type to be Internet Protocol version six (IPv6) multicast responsive to determining a match between the first two bytes of the destination MAC address of the data frame and a corresponding first constant value, and a match between a MAC-EtherType value of the data frame and a corresponding second constant value, the first and second constant values specific to IPv6 multicast.

5. The AFDX switch of claim 4, wherein the processing circuitry is configured to identify the communication flow among the plurality of communication flows based on a first subset of bits of the destination MAC address or a hash of a second subset of bits of the destination MAC address.

6. The AFDX switch of claim 1, wherein determining the data traffic type associated with the data frame includes determining the data traffic type to be Internet Protocol version four (IPv4) unicast responsive to determining a match between a first byte of the destination MAC address of the data frame and a corresponding first constant value, and a match between a MAC-EtherType value of the data frame and a corresponding second constant value, the first and second constant values specific to IPv4 unicast.

7. The AFDX switch of claim 6, wherein the processing circuitry is configured to identify the communication flow among the plurality of communication flows based on at least one of:
- a hash of a destination IP address, a source IP address, and a type of service value associated with the data frame; or
- a hash of the destination MAC address and a source MAC address.

8. The AFDX switch of claim 1, wherein determining the data traffic type associated with the data frame includes determining the data traffic type to be Internet Protocol version six (IPv6) unicast responsive to determining a match between the first two bytes of the destination MAC address of the data frame and a first constant value, and a match between a MAC-EtherType value of the data frame and a second constant value, the first and second constant values specific to IPv6 unicast.

9. The AFDX switch of claim 8, wherein the processing circuitry is configured to identify the communication flow among the plurality of communication flows based on at least one of:
- a hash of a destination IP address, a source IP address, and a traffic class value associated with the data frame; or
- a hash of the destination MAC address and a source MAC address.

10. The AFDX switch of claim 1, wherein determining the data traffic type associated with the data frame includes determining the data traffic type to be address resolution protocol (ARP) traffic responsive to determining a match between a MAC-EtherType value of the data frame and a corresponding constant value specific to ARP.

11. A method for routing data frames by an avionics full-duplex switched Ethernet (AFDX) switch, the method comprising:
- maintaining, by the AFDX switch, communication flow parameters for a plurality of communication flows handled by the AFDX switch;
- receiving, by the AFDX switch, a data frame via a receive port of the AFDX switch; determining a mismatch between a destination media access control (MAC) address of the data frame and a MAC address constant specific to a predefined AFDX related protocol;
- determining, responsive to the mismatch between the MAC address of the data frame and the MAC address constant specific to the predefined AFDX related protocol, a data traffic type associated with the data frame based on a first portion of a header of the data frame, the data traffic type different than data traffic associated with the predefined AFDX related protocol;
- comparing, responsive to determining the data traffic type associated with the data frame, a second portion of the header of the data frame to identifiers of the plurality of communication flows; and
- responsive to identifying a communication flow among the plurality of communication flows with a respective identifier matching the second portion of the header of the data frame, routing the data frame based on the communication flow parameters maintained by the AFDX switch of the identified communication flow.

12. The method of claim 11, wherein determining the data traffic type associated with the data frame includes determining the data traffic type to be Internet Protocol version four (IPv4) multicast responsive to determining a match between the first three bytes of the destination MAC address of the data frame and a corresponding first constant value, and a match between a MAC-EtherType value of the data frame and a corresponding second constant value, the first and second constant values specific to IPv4 multicast.

13. The method of claim 12 further comprising identifying the communication flow among the plurality of communication flows based on a first subset of bits of the destination MAC address or a hash of a second subset of bits of the destination MAC address.

14. The method of claim 11, wherein determining the data traffic type associated with the data frame includes determining the data traffic type to be Internet Protocol version six (IPv6) multicast responsive to determining a match between the first two bytes of the destination MAC address of the data frame and a corresponding first constant value, and a match between a MAC-EtherType value of the data frame and a corresponding second constant value, the first and second constant values specific to IPv6 multicast.

15. The method of claim 14 further comprising identifying the communication flow among the plurality of communication flows based on a first subset of bits of the destination MAC address or a hash of a second subset of bits of the destination MAC address.

16. The method of claim 11, wherein determining the data traffic type associated with the data frame includes determining the data traffic type to be Internet Protocol version four (IPv4) unicast responsive to determining a match between a first byte of the destination MAC address of the data frame and a corresponding first constant, and a match between a MAC-EtherType value of the data frame and a corresponding second constant value, the first and second constant values specific to IPv4 unicast.

17. The method of claim 16 further comprising identifying the communication flow among the plurality of communication flows based on at least one of:
- a hash of a destination IP address, a source IP address, and a type of service value associated with the data frame; or
- a hash of the destination MAC address and a source MAC address.

18. The method of claim 11, wherein determining the data traffic type associated with the data frame includes determining the data traffic type to be Internet Protocol version six (IPv6) unicast responsive to determining a match between the first two bytes of the destination MAC address of the data frame and a first constant value, and a match between a MAC-EtherType value of the data frame and a second constant value, the first and second constant values specific to IPv6 unicast.

19. The method of claim 18 further comprising identifying the communication flow among the plurality of communication flows based on at least one of:
- a hash of a destination IP address, a source IP address, and a traffic class value associated with the data frame; or
- a hash of the destination MAC address and a source MAC address.

20. An avionics full-duplex switched Ethernet (AFDX) system comprising:
- at least one AFDX end system configured to determine traffic envelopes for data traffic not associated with a predefined AFDX related protocol using respective burst and data rate values; and
- an AFDX switch configured to:
  maintain communication flow parameters for a plurality of communication flows handled by the AFDX switch;
  receive a data frame via a receive port of the AFDX switch; determine a mismatch between a destination media access control (MAC) address of the data frame and a MAC address constant specific to the predefined AFDX related protocol;

determine, responsive to the mismatch between the MAC address of the data frame and the MAC address constant specific to the predefined AFDX related protocol, a data traffic type associated with the data frame based on a first portion of a header of the data frame, the data traffic type different than data traffic associated with the predefined AFDX related protocol;

compare, responsive to determining the data traffic type associated with the data frame, a second portion of the header of the data frame to identifiers of the plurality of communication flows; and responsive to identifying a communication flow among the plurality of communication flows with a respective identifier matching the second portion of the header of the data frame, route the data frame based on the communication flow parameters maintained by the AFDX switch of the identified communication flow.

* * * * *